May 22, 1956

C. J. KENNEDY 2,746,151

TRACKING MECHANISM

Filed Nov. 17, 1951

INVENTOR.
CHARLES J. KENNEDY
BY
ATTORNEY

United States Patent Office 2,746,151
Patented May 22, 1956

2,746,151

TRACKING MECHANISM

Charles J. Kennedy, Oaklyn, N. J., assignor to Collins Radio Company, Cedar Rapids, Iowa, a corporation of Iowa Application November 17, 1951, Serial No. 256,904

1 Claim. (Cl. 33—1)

This invention relates in general to tracking apparatus and in particular to means for simultaneously indicating a position on a plotting board.

In navigation it is ofttimes desirable to indicate on a plotting board the instantaneous position of a moving body. For example, it is desirable in enemy detection to present the enemy's position on a plotting board.

It is an object of this invention to provide a tracking mechanism which may be moved in the $x$ and $y$ directions.

Another object of this invention is to provide a pulley and belt arrangement for indicating on a plotting board the position of a moving body.

Further advantages, objects and features of this invention will become apparent from the following description and claim when read in view of the drawings in which:

Figure 1:
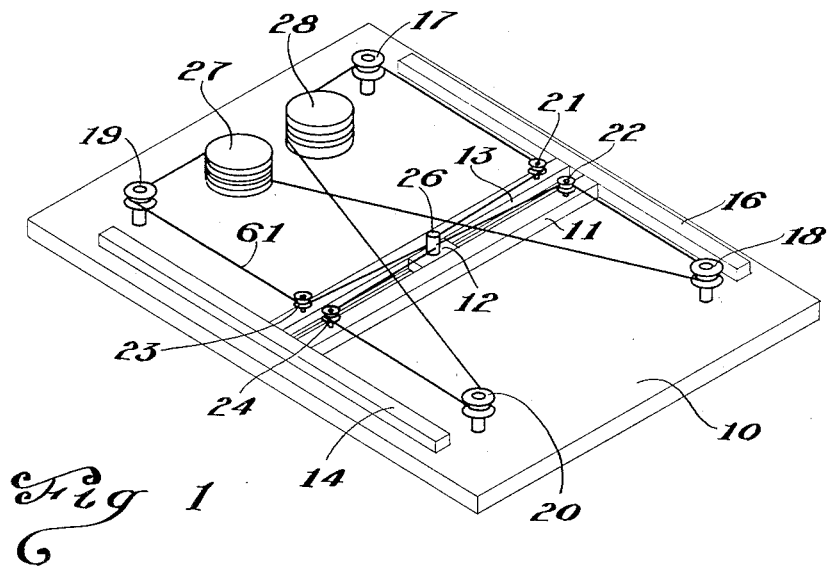
Figure 1 is a rear isometric view of the plotting board of this invention.
Figure 2:
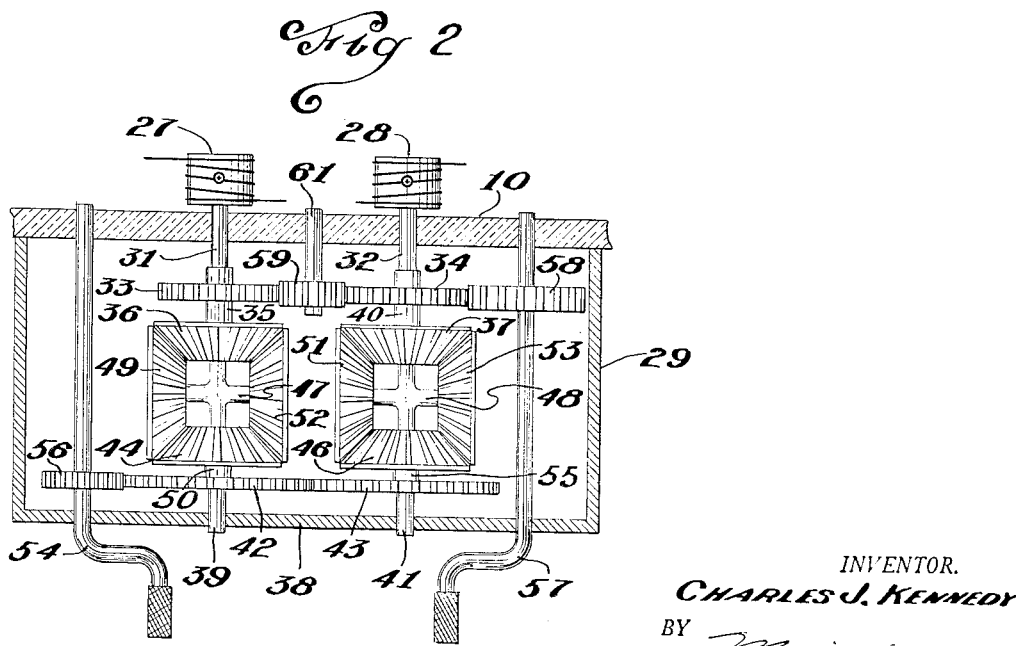
Figure 2 is a detail view of the control cranks and differential of this invention.

Figure 1 illustrates a plotting board 10 which might be translucent and made from plastic. It has mounted on its rear side a slide member 11 which supports a smaller slide member 12 in a longitudinal slot 13. The member 12 supports a pointer which extends through the member 11 and is visible on the front side of the plotting board 10. This point indicates the position of the object being tracked.

The member 11 fits between a pair of guides 14 and 16 which are mounted to the member 10 and four pulleys 17, 18, 19 and 20 are rotatably supported adjacent each corner of the plotting board 10. The slide 11 has mounted at each of its corners pulleys 21, 22, 23 and 24. The member 12 has a projection 26 extending outwardly thereon.

A pair of capstans or pulleys 27 and 28 are mounted between pulleys 17 and 19. Attached to the front of plotting board 10 is a box-shaped cover member 29. The capstans 27 and 28 are fixed on shafts 31 and 32, respectively. Shafts 31 and 32 are rotatably supported by the plotting board 10. A pair of gears 33 and 34 are fixed on sleeves 35 and 40 respectively. Sleeves 35 and 40 are rotatably mounted on shafts 31 and 32 respectively. First gears 36 and 37 are non-rotatably supported on sleeves 35 and 40 respectively.

The front portion 38 of the cover member 29 rotatably supports a pair of shafts 39 and 41 which have rotatably mounted thereon, sleeves 50 and 55, respectively. Second gears 44 and 46 of the differential are non-rotatably mounted on the sleeves 50 and 51 respectively. Gears 42 and 43 are fixedly mounted on sleeves 50 and 55, respectively.

Yokes 47 and 48 rotatably support the gears 36, 37, 44 and 46 of the differentials and also third and fourth gears designated as 49, 51, 52 and 53 respectively. The shafts 31 and 32 are connected to the yokes.

A crank 54 is rotatably supported between the plates 10 and 38 and carries a gear 56 thereon which engages the gear 42. Gear 42 meshes with gear 43. A second crank 57 is rotatably supported between the members 10 and 38 and carries a gear 58 which meshes with gear 34. An idler gear 59 is rotatably supported by shaft 61 mounted in plate 10 and meshes with gears 33 and 34.

It is to be seen that when the crank 54 is rotated while crank 57 is held stationary that the capstans 27 and 28 rotate in the opposite direction. If the crank 57 is rotated while crank 54 is held stationary the capstans 27 and 28 will rotate in the same direction. Thus, the differential mechanism shown in Figure 3 allows the capstans 27 and 28 to be rotated in the same or opposite directions depending upon the relative motion of the cranks 54 and 57.

The apparatus of Figure 1 is so connected by flexible belting 61 that when the crank arm 57 is rotated while crank 54 is held stationary the slide 12 is moved relative to member 11 and member 11 remains fixed. If crank 54 is rotated while crank 57 is held stationary the slide 12 will remain fixed relative to the member 11 and member 11 will move relative to the plotting board 10.

If the cranks 54 and 57 are simultaneously rotated, the members 11 and 12 move simultaneously with the respective motions being proportional to the amount of rotation of their control cranks.

The manner in which these results are accomplished is shown in Figure 1 wherein the belt 61 is shown mounted so as to pass over the various pulleys and capstans. Starting at the projection 26 it is seen that the belt passes over the pulleys 21, 17, the capstan 28, the pulleys 20, 24, the projection 26, the pulleys 23, 19, capstan 27, pulleys 18, 22, and back to the projection 26. The belt is rigidly attached to the projection 26.

The rigging of the belt and pulleys shown in Figure 1 operates in the manner described and the results may be verified by analyzing the motion of the slides 11 and 12 when the capstans 27 and 28 are rotated in the same and opposite directions, respectively.

Applicant has built and tested a model according to Figure 1 and is using it in an aircraft position plotting board. It is to be understood, of course, that the cranks 54 and 57 need not be manually driven but may be driven by suitable servo motors that may receive signals from radio resolvers, for example. The cranks are used for illustrative purposes only.

Although this invention has been described with respect to particular modifications thereof, it is not to be so limited as changes and modifications may be made therein which are within the full intended scope of the invention as defined by the appended claim.

I claim:

A tracking mechanism for continuously presenting a fix on a plotting board comprising, a pair of longitudinal guides mounted parallel to each other and adjacent opposite edges of said plotting board, a first slide member receivable transversely between said guides and movable relative thereto, said first slide member formed with a longitudinal slot transversely of said guides, a second slide member receivable within said slot formed in said first slide member and movable transversely of said guides, first, second, third and fourth pulleys rotatably supported adjacent the four corners of said plotting board, fifth, sixth, seventh and eighth pulleys rotatably supported on said first slide member adjacent its four corners, an indicator attached to the second slide member and visible through said plotting board to indicate a fixed position, a projection extending from said second slide member on the reverse side of said second slide member, a pair of capstan shafts rotatably supported in said plotting board between the first and third pulleys, a first capstan fixed on the first capstan shaft, a second capstan fixed on said second capstan shaft, a first flexible means attached to the projection and passing, respectively, over the fifth and first pulleys and then passing counterclockwise so as to encircle the first capstan, then over the fourth and eighth pulleys and attached to the projection, a second flexible means attached to the projection and passing over the sixth and second pulleys and then encircling the second capstan in a counterclockwise direction and then over the third and seventh pulleys to the projection where it is attached, a housing mounted on said plotting board and rotatably supporting said first and second capstan shafts, a first transverse shaft extending from said first capstan shaft intermediate the plotting board and said housing, a second transverse shaft extending from said second capstan shaft intermediate the plotting board in said housing, first and second beveled gears rotatably mounted, respectively, on opposite ends of said first transverse shaft, third and fourth beveled gears rotatably mounted, respectively, on opposite ends of said second transverse shaft, a first sleeve rotatably supported between the first transverse shaft and said plotting board on the first capstan shaft, a second sleeve rotatably supported on the second capstan shaft between the second transverse shaft and the plotting board, a fifth beveled gear in engagement with the first and second beveled gears and fixed on said first sleeve, a sixth beveled gear in engagement with the third and fourth beveled gears and fixed on the second sleeve, a third sleeve rotatably supported on said first capstan shaft between the first transverse shaft and the housing, a fourth sleeve rotatably supported on the second capstan shaft between the second transverse shaft and the housing, a seventh beveled gear fixed on the third sleeve in engagement with the first and second beveled gears, an eighth beveled gear fixed on the fourth sleeve in engagement with the third and fourth beveled gears, a first cyclic gear mounted on the first sleeve, a second cyclic gear mounted on the second sleeve, a third cyclic gear mounted on the third sleeve, and a fourth cyclic gear mounted on the fourth sleeve, an idler shaft rotatably supported by the plotting board, an idler gear mounted on the idler shaft and in engagement with the first and second cyclic gears, a first and second crank shaft rotatably supported between the housing and the plotting board, a first drive gear mounted on the first crank shaft and in engagement with the fourth cyclic gear, a second drive gear mounted on the second drive shaft and in engagement with the first cyclic gear, and the third and fourth cyclic gears engaged.

References Cited in the file of this patent

UNITED STATES PATENTS

| Number | Name | Date |
|---|---|---|
| 1,412,050 | Fuller | Apr. 11, 1922 |
| 2,366,772 | Ebeling | Jan. 9, 1945 |
| 2,467,808 | Canada | Apr. 19, 1949 |
| 2,566,247 | Pierce et al. | Aug. 28, 1951 |
| 2,566,546 | Barnes et al. | Sept. 4, 1951 |
| 2,627,673 | Droz | Feb. 10, 1953 |
| 2,675,291 | Webster | Apr. 13, 1954 |

FOREIGN PATENTS

| 3,817 | Great Britain | 1890 |